US010726008B2

(12) United States Patent
Kirk et al.

(10) Patent No.: US 10,726,008 B2
(45) Date of Patent: Jul. 28, 2020

(54) ACCELERATING DATABASE QUERIES USING ENHANCED PARTITION ELIMINATION

(71) Applicant: Sybase, Inc., Dublin, CA (US)

(72) Inventors: Steven A. Kirk, Chelmsford, MA (US); Roland F. Mckenney, Billerica, MA (US)

(73) Assignee: Sybase, Inc., Dublin, CA (US)

( * ) Notice: Subject to any disclaimer, the term of this patent is extended or adjusted under 35 U.S.C. 154(b) by 507 days.

(21) Appl. No.: 14/800,405

(22) Filed: Jul. 15, 2015

(65) Prior Publication Data

US 2017/0017673 A1 Jan. 19, 2017

(51) Int. Cl.
*G06F 16/2453* (2019.01)

(52) U.S. Cl.
CPC .............. *G06F 16/24542* (2019.01)

(58) Field of Classification Search
CPC ................................ G06F 17/30463
USPC ...................................... 707/718
See application file for complete search history.

(56) References Cited

U.S. PATENT DOCUMENTS

| 8,843,499 B2 | 9/2014 | Kirk et al. | |
| 9,652,496 B1* | 5/2017 | Antova | G06F 17/30466 |
| 2009/0037365 A1* | 2/2009 | Sinclair | G06F 17/30463 |
| 2013/0166557 A1* | 6/2013 | Fricke | G06F 17/30442 707/737 |
| 2015/0066986 A1* | 3/2015 | Piecko | G06F 16/24553 707/779 |
| 2016/0078023 A1* | 3/2016 | Schalk | G06F 17/3038 707/825 |
| 2016/0350392 A1* | 12/2016 | Rice | G06F 16/27 |

* cited by examiner

*Primary Examiner* — Pierre M Vital
*Assistant Examiner* — Alicia M Antoine
(74) *Attorney, Agent, or Firm* — Mintz Levin Cohn Ferris Glovsky and Popeo, P.C.

(57) ABSTRACT

Increasing the efficiency of performing queries on databases by eliminating partitions during a database query. The database query configured to access a database table having one or more columns and one or more rows, the database query including a condition on a specified basis column. The database table being partitioned on the basis of the specified column, the specified column having one or more distinct values and the partitioning including mapping, by the at least one programmable processor, individual ones of the one or more distinct values to individual partitions causing each row in the table to be mapped to a specific partition. Candidate partitions and guaranteed partitions can be identified. The database query can be applied only to candidate partitions. All rows which satisfy the database query and all the rows of the guaranteed partition can be forward for processing.

16 Claims, 7 Drawing Sheets

TABLE T, RANGE PARTITIONED ON T.DATE

| PARTITION | PARTITION BOUNDS |
|---|---|
| 1 | 1/1/2003 - 12/21/2003 |
| 2 | 1/1/2004 - 12/21/2004 |
| 3 | 1/1/2005 - 12/21/2005 |
| 4 | 1/1/2006 - 12/21/2006 |
| 5 | 1/1/2007 - 12/21/2007 |
| 6 | 1/1/2008 - 12/21/2008 |
| 7 | 1/1/2009 - 12/21/2009 |

TABLE T, RANGE PARTITIONED ON T.DATE

| PARTITION | T.DATE DISTINCT CELL VALUES | PARTITION BOUNDS |
|---|---|---|
| 1 | 1/7/2003, 7/18/2003 | 1/1/2003 – 12/31/2003 |
| 2 | 2/3/2004, 2/28/2004, 9/16/2004 | 1/1/2004 – 12/31/2004 |
| 3 | 3/5/2005, 6/11/2005, 11/4/2005 | 1/1/2005 – 12/31/2005 |
| 4 | 4/18/2006, 12/1/2006 | 1/1/2006 – 12/31/2006 |
| 5 | 3/26/2007 | 1/1/2007 – 12/31/2007 |
| 6 | 2/12/2008, 5/2/2008, 8/3/2008 | 1/1/2008 – 12/31/2008 |
| 7 | 5/17/2009, 7/21/2009 | 1/1/2009 – 12/31/2009 |

FIG. 4

TABLE S, HASH PARTITIONED ON S_CUSTOMER ← 600

| S_CUSTOMER DISTINCT CELL VALUES | PARTITION_NUMBER(S_CUSTOMER) |
|---|---|
| 02663 | 1904 |
| 02884 | 1905 |
| 05196 | 1916 |
| 07631 | 1914 |
| 11876 | 1914 |
| 24240 | 1914 |
| 35973 | 1915 |
| 45255 | 1904 |
| 46080 | 1912 |
| 49697 | 1913 |

| PARTITION | S_CUSTOMER DISTINCT CELL VALUES PER PARTITION |
|---|---|
| 1904 | 02663, 45255 |
| 1905 | 02884 |
| 1912 | 46080 |
| 1913 | 49697 |
| 1914 | 07631, 11876, 24240 |
| 1915 | 35973 |
| 1916 | 05196 |

*FIG. 6B*

ACCELERATING DATABASE QUERIES USING ENHANCED PARTITION ELIMINATION

TECHNICAL FIELD

The subject matter described herein relates to database queries.

BACKGROUND

Database management systems offer the ability to partition tables to make the database querying process more efficient. Partition elimination techniques increase database querying efficiency by eliminating from subsequent consideration any table partitions which cannot possibly satisfy the query criteria and restrict subsequent query processing to only those rows residing in the remaining partitions. Typically, partition elimination is limited to equality conditions for tables which have been hash partitioned, to equality and inequality conditions for tables which have been list partitioned, and to range and equality conditions for tables which have been range partitioned.

SUMMARY

In one aspect, optimizing the elimination of partitions during the processing of a database query is described. A database query can be accepted. The database query can be configured to access a database table. The database table can have one or more columns and one or more rows. The database query can include a condition on a specified basis column. The database table can be partitioned. The database table can be partitioned on the specified basis column. The specified basis column can have one or more distinct values. The partitioning can include mapping individual ones of the one or more rows of the database table to individual partitions.

Guaranteed partitions can be identified. The guaranteed partitions are partitions that only include cell values guaranteed to satisfy the condition on the specified basis column. Candidate partitions can be identified, the candidate partitions can be partitions that are capable of containing column cell values that satisfy the condition on the specified basis column. The condition can be evaluated. Evaluating the condition can comprise limiting the evaluation of the condition to each row within the candidate partitions. In other words, the condition is not evaluated for rows in guaranteed partitions nor disqualified partitions.

All rows from partitions guaranteed to satisfy the condition on the specified basis column plus all rows for which the condition on the specified basis column was evaluated and which satisfied that condition can be forwarded on for subsequent query processing.

In some implementations, the efficiency of identifying guaranteed partitions and candidate partitions and evaluating the condition on the candidate partitions can be determined. This efficiency can be compared to the efficiency of evaluating the condition on every row in the partitions resulting from partitioning the database table on the basis of the specified basis column. In some variations, it can not be an efficient practice to attempt to optimize the processing of a query having one or more conditions by determining the "candidate" or the "guaranteed" partitions.

Evaluating the condition on each row within the candidate partitions can be limited to instances where it is determined that doing so is more efficient than simply applying the query conditions to all partitions.

Another aspect of the current subject matter can relate to other methods of optimizing partition elimination. A database query can be accepted. The database query can be configured to access a database table having one or more columns and one or more rows. The database query can include a condition on a specified basis column. The database table can be partitioned. The database table can be partitioned on the basis of the specified column. The specified column can have one or more distinct values. The partitioning can include mapping individual ones of the one or more distinct values to individual partitions causing each row in the table to be mapped to a specific partition. The distinct values present in the specified basis column within each partition can be obtained.

For each of the partitions based on the specific basis column, it can be identified whether the partition is a candidate partition. A candidate partition can be a partition capable of containing one or more of the distinct values that satisfy the condition on the specified basis column. The condition can be evaluated on the specified basis column for each row within the candidate partitions. All rows which satisfy the condition on the specified basis column can be forwarded on for subsequent query processing.

In some variations, an additional restriction condition can be inferred. The additional restriction condition that is inferred can be inferred to be one that is satisfied by all rows contained within the candidate partitions. In other variations, the inferred partition restriction condition can be applied. The inferred partition restriction condition can be applied on all rows within the candidate partitions to provide a limited set of rows. The limited set of rows can be rows satisfying the inferred additional restriction condition. The limited set of rows can be forwarded on for additional query processing.

In some variations, guaranteed partitions can be identified. The guaranteed partitions can be partitions that only include cell values guaranteed to satisfy the condition on the specified basis column. All rows of the guaranteed partitions can be forwarded on for subsequent query processing. Guaranteed partitions can be identified. Guaranteed partitions can be partitions that only include cell values guaranteed to satisfy the condition on the specified basis column. All rows of the guaranteed partitions can be forwarded on for subsequent query processing.

The one or more distinct values of the specified column can be stored as a data dictionary associated with the specified column. The one or more distinct values of the specified column can be stored as a data dictionary associated with individual ones of the partitions. The one or more distinct values of the specified column can be stored at leaves of a B-tree. The one or more rows of the partitioned table can be split across multiple stores. Metadata identifying the distinct values can be stored separately for each store. Candidate partitions can be identified independently for each store. The condition can be independently evaluated for each store. The condition can be evaluated on the specified basis column for each row within the candidate partitions in that store. In some implementations, guaranteed partitions can be identified and evaluated independently for each store.

A restriction condition can be identified that is satisfied by one or more rows of a column associated with the guaranteed partitions only. The database tables can include one or more integer row identifiers stored as bitmaps. The bitmaps can represent one or more rows in a partition that satisfy one or more conditions of the query.

A compound condition can be generated. The compound condition that can be generated that includes a partition restriction that is satisfied by rows that reside in a candidate partition and satisfied by rows that reside in a guaranteed partition. The compound condition can be evaluated on the rows of the partitioned database table. An efficiency of generating and applying the compound condition can be determined. The compound condition can be evaluated in response to determining that generating and applying the compound condition increases efficiency. The efficiency of identifying candidate partitions and evaluating the condition on the candidate partitions can be compared to the efficiency of evaluating the condition on every row in the partitions resulting from partitioning the database table on the basis of the specified basis column. The condition can ne evaluated on each row within the candidate partitions in response to determining that it is more efficient to identify the candidate partitions and evaluate the condition on the candidate partitions compared to evaluating the condition on every row in the partitions resulting from partitioning the database table on the basis of the specified basis column.

Another aspect of the current subject matter can relate to other methods of more efficiently eliminating partitions during a database query. A database query can be accepted. The database query can be configured to access a database table having one or more columns and one or more rows. The database query can include a specified column as the basis for partitioning the table and a query condition on that specified partition basis column.

The database table can be partitioned. The database table can be partitioned on the basis of the specified column within the database. The partitioning can include mapping individual ones of the one or more rows of individual columns to individual partitions on the basis of the specified column. It can be identified for individual ones of the partitions whether the partition is a candidate partition. The candidate partition can be capable of containing values which can satisfy the query condition. An additional restriction condition can be inferred that is satisfied by all rows contained within the candidate partitions. The inferred partition restriction condition can be applied on all rows within the candidate partitions to provide an intermediate set of rows. The intermediate set of rows can satisfy the inferred additional restriction condition. The query condition can be evaluated on the specified basis column on the intermediate set of rows to provide a limited set of rows that satisfy the condition on the specified basis column. The limited set of rows that satisfy the condition on the specified basis column can be forwarded for subsequent query processing.

In some variations, the database query can include one or more additional query conditions. Prior to evaluating the query condition on the specified basis column on the intermediate set of rows the one or more additional query conditions can be applied on all rows in the intermediate set of rows.

Prior to inferring the additional restriction condition, guaranteed partitions can be identified. The guaranteed partitions can be partitions containing cell values guaranteed to satisfy the condition on the specified basis column. All rows from the guaranteed partitions together with the limited set of rows can be forwarded for subsequent query processing.

The efficiency of inferring an additional restriction condition that is satisfied by all rows contained within the candidate partitions and applying the inferred additional restriction condition can be compared to the efficiency of applying the query condition to every row in the partitions resulting from partitioning the database table on the basis of the specified basis column.

The inferred partition restriction condition can be applied on all rows within the candidate partitions in response to determining that inferring and applying the additional restriction condition is more efficient than applying the query condition to every row in the partitions resulting from partitioning the database table on the basis of the specified basis column.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more advantages. For example, the current subject matter can increase the utility of table partitioning by increasing the efficiency at which the computer systems operating with a database(s) can execute queries on the database(s).

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to systems and methods that include or involve hardware and software, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 is an illustration of a table, as in FIG. 1, with additional information describing the distinct values present in the partition basis column T.DATE;

DETAILED DESCRIPTION

Figure 1:
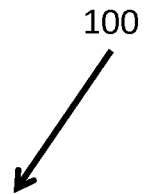
FIG. 1 is an illustration of a range partitioned table, where the partition basis column is T.DATE and the defined range partition boundaries place each year of data into a separate partition.

One advantage of partitioned tables is that sets of rows within the table are collocated which are either commonly accessed together or that share some useful semantic attribute. Collocating rows in a database table that are often accessed together can increase the overall efficiency of database queries. Database queries can include a plurality of conditions. Rows can be accessed by partitioning. Partitioning schemes used to partition database tables can include hash partitioning, range partitioning, and list partitioning. Hash partitioning is where the rows of the table are partitioned based on a hash-number computed from the value of one or more columns. Range partitioning is where the rows of the table are partitioned based on disjoint bounded ranges of values from one column. List partitioning is where the rows of the table are partitioned based on one column and an explicit list of values per partition.

Table partitioning techniques can be leveraged to improve the performance of executing database queries. Once such optimization technique is partition elimination. Partition elimination can leverage the presence of a query condition on a partition basis column. An example of a query condition is an equality condition equating a column to a constant that resides within the WHERE clause of an SQL query. Partition elimination can leverage the presence of a query condition on a partition basis column to identify the set of partitions in a database table that cannot possibly satisfy the query condition. This set of partitions can be referred to as "disqualified" partitions. Subsequent processing of query conditions can be limited to the rows residing in the remaining partitions. The remaining partitions are ones where the rows may be able to satisfy that condition and can be referred to as "candidate" partitions.

Optimization can be limited to equality query conditions when the column, upon which partitioning is based, is being used as the partitioning basis for hash partitioning the table. Optimization can be limited to equality and inequality query conditions when the column, upon which partitioning is based, is being used as the partitioning basis for list partitioning the table. Optimization can be limited to range and equality conditions when the column, upon which partitioning is based, is being used as the partitioning basis for range partitioning the table.

Partition elimination optimization can be described as including the following elements: a query that accesses a specified database table; that specified table can be partitioned on the basis of a specific column, such that each distinct value in that column maps to one and only one partition, and thereby maps each row in the table into a specific partition; the query can contain a restriction condition local to that partitioned table which refers to that partition basis column; the database can have the ability to identify for each partition whether that partition (i) may contain values which will satisfy that condition (a.k.a. a "candidate" partition) or (ii) cannot contain any values that would satisfy that condition (a.k.a. a "disqualified" partition); and, the database can have the ability to limit the evaluation of such a condition and all subsequent conditions of the query local to that table, to only those rows which reside in the set of "candidate" partitions. The partition elimination optimization can be limited to specific combinations of condition types and table partitioning types.

FIG. 1 is an illustration of a range partitioned table 100, where the partition basis column is T.DATE and the defined range partition boundaries place each year of data into a separate partition. An example partition basis column restriction, i.e. a column-specific condition of the database query, on the table 100 can be T.DATE BETWEEN 'Jul. 1, 2006' AND 'Jan. 31, 2008'. The partition elimination optimization can be used to identify those partitions that do not satisfy the query condition, or "disqualified" partitions. In the Table 100, disqualified partitions would include partitions 1, 2, 3, and 7. Consequently, partitions 4, 5, and 6 are partitions that may have values satisfying the condition, or "candidate" partitions. The condition can be evaluated on the "candidate" partitions and not the "disqualified partitions." This can more than halve the processing time necessary to complete the evaluation of the query condition across all of the partitions.

The cost of evaluating a predicate, or query condition, against each partition can be sizable. Partition elimination can be improved by identifying partitions where all of the cell values in the partition basis column are guaranteed to satisfy the specified query condition on the partition basis column. Such partitions can be referred to as "guaranteed" partitions. The partition basis column can be evaluated for that column-specific query condition and then the other local conditions can be evaluated on all rows stored in candidate partitions. Evaluation of only the other local conditions on the rows stored in guaranteed partitions can be performed.

Figure 2:
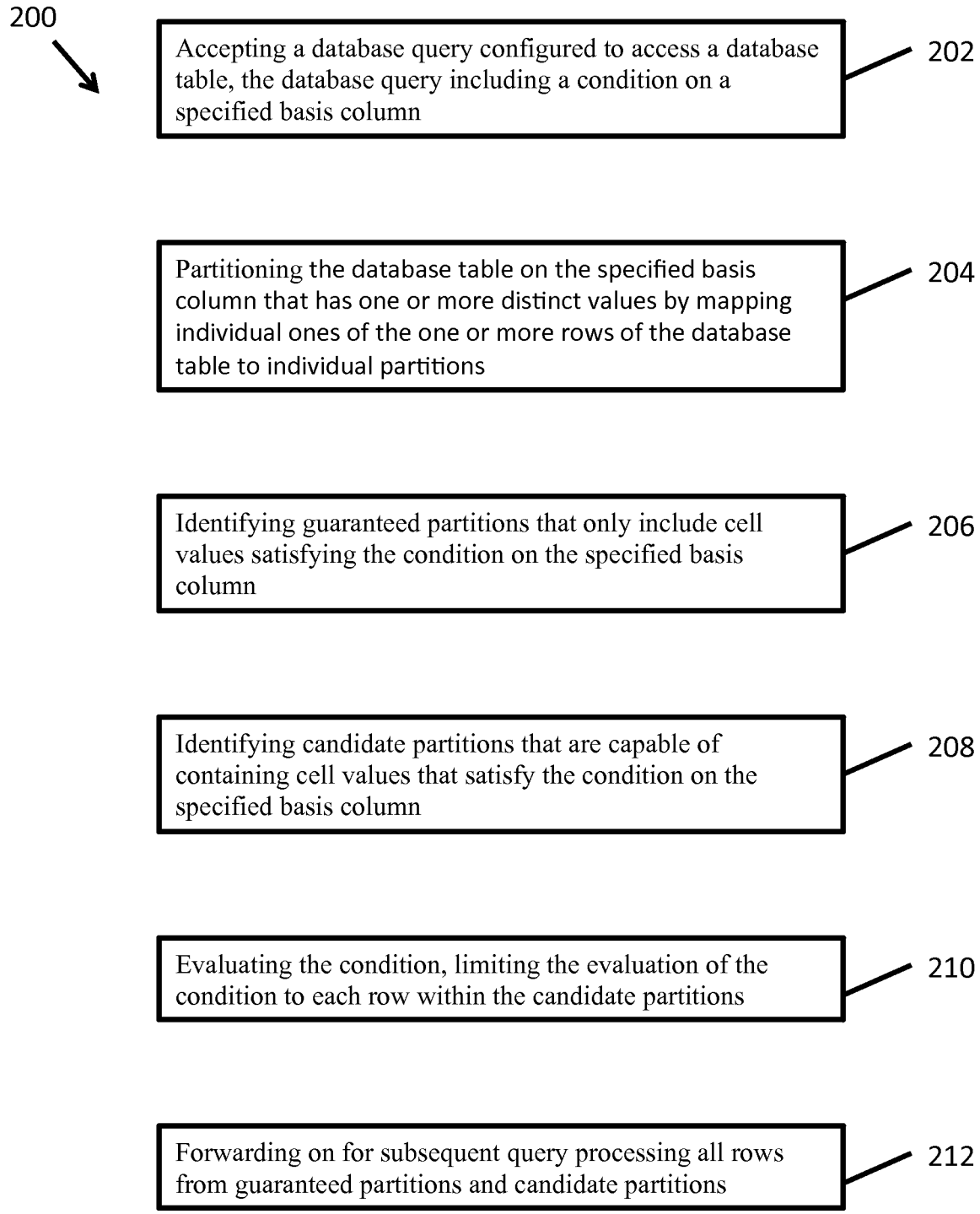
FIG. 2 is a process flow diagram illustrating aspects of a method having one or more features consistent with implementations of the current subject matter.

FIG. 2 is an illustration of a process 200 having one or more elements consistent with the current subject matter. At 202, a database query can be accepted. The database query can be configured to access a database table. The database table can have one or more columns and one or more rows. The database query can include a condition on a specified basis column.

At 204, the database table can be partitioned. The database table can be partitioned on the specified basis column. The specified basis column can have one or more distinct values. The partitioning can include mapping individual ones of the one or more rows of the database table to individual partitions.

At 206, guaranteed partitions can be identified. The guaranteed partitions are partitions that only include cell values guaranteed to satisfy the condition on the specified basis column.

At 208, candidate partitions can be identified, the candidate partitions can be partitions that are capable of containing column cell values that satisfy the condition on the specified basis column. In some variations, identifying the candidate partitions and identifying the guaranteed partitions can be a mutually exclusive exercise. A guaranteed partition can be identified that only contains values guaranteed to satisfy the condition. Candidate partitions can be identified that are capable of containing values that can satisfy the condition, but might contain other values that do not satisfy the condition. Consequently, candidate partitions and guaranteed partitions can be exclusive sets of partitions.

At 210, the condition can be evaluated. Evaluating the condition can comprise limiting the evaluation of the condition to each row within the candidate partitions. In other words, the condition is not evaluated for rows in guaranteed partitions nor disqualified partitions.

At 212, all rows from partitions guaranteed to satisfy the condition on the specified basis column plus all rows for which the condition on the specified basis column was evaluated and which satisfied that condition can be forwarded on for subsequent query processing. In some implementations, the efficiency of identifying guaranteed partitions and candidate partitions and evaluating the condition on the candidate partitions can be determined. This efficiency can be compared to the efficiency of evaluating the condition on every row in the partitions resulting from partitioning the database table on the basis of the specified basis column. In some variations, it can not be an efficient practice to attempt to optimize the processing of a query having one or more conditions by determining the "candidate" or the "guaranteed" partitions. Evaluating the condition on each row within the candidate partitions can be limited to instances where it is determined that doing so is more efficient than simply applying the query conditions to all partitions.

An example of a database query condition can be provided as T.DATE BETWEEN 'Jul. 1, 2006' AND 'Jan. 31, 2008'. The partition elimination optimizer can be configured to identify the same set of "disqualified" partitions as {1, 2, 3, and 7}, but partition 5 is now identified as a "guaranteed" partition, leaving the set of "candidate" partitions as {4, and 6}. The "candidate" partitions are the only partitions remaining where the BETWEEN condition must be evaluated on each of the partition rows. Consequently, the performance and cost advantage is realized by avoiding the evaluation of the BETWEEN condition for all the rows in partition 5.

In some instances, the partition basis column can line up exactly with partition boundaries provided by the conditions of the database query. For example, where a basis column restriction condition of T.DATE BETWEEN 'Jan. 1, 2006' AND 'Dec. 31, 2007' is applied to Table T of FIG. 1. In this example, partition elimination optimization can be used to identify that partitions {1, 2, 3, 6, and 7} are "disqualified" partitions, leaving partitions {4 and 5} as the "candidate partitions. The query condition must be evaluated for each value within each candidate partition. However, the optimizer will also identify that partitions {4 and 5} are guaranteed to have values that will satisfy the example condition and are therefore "guaranteed" partitions. There are no "candidate" partitions in this example. Consequently, there are no rows for which this BETWEEN condition needs to be evaluated.

Figure 3:
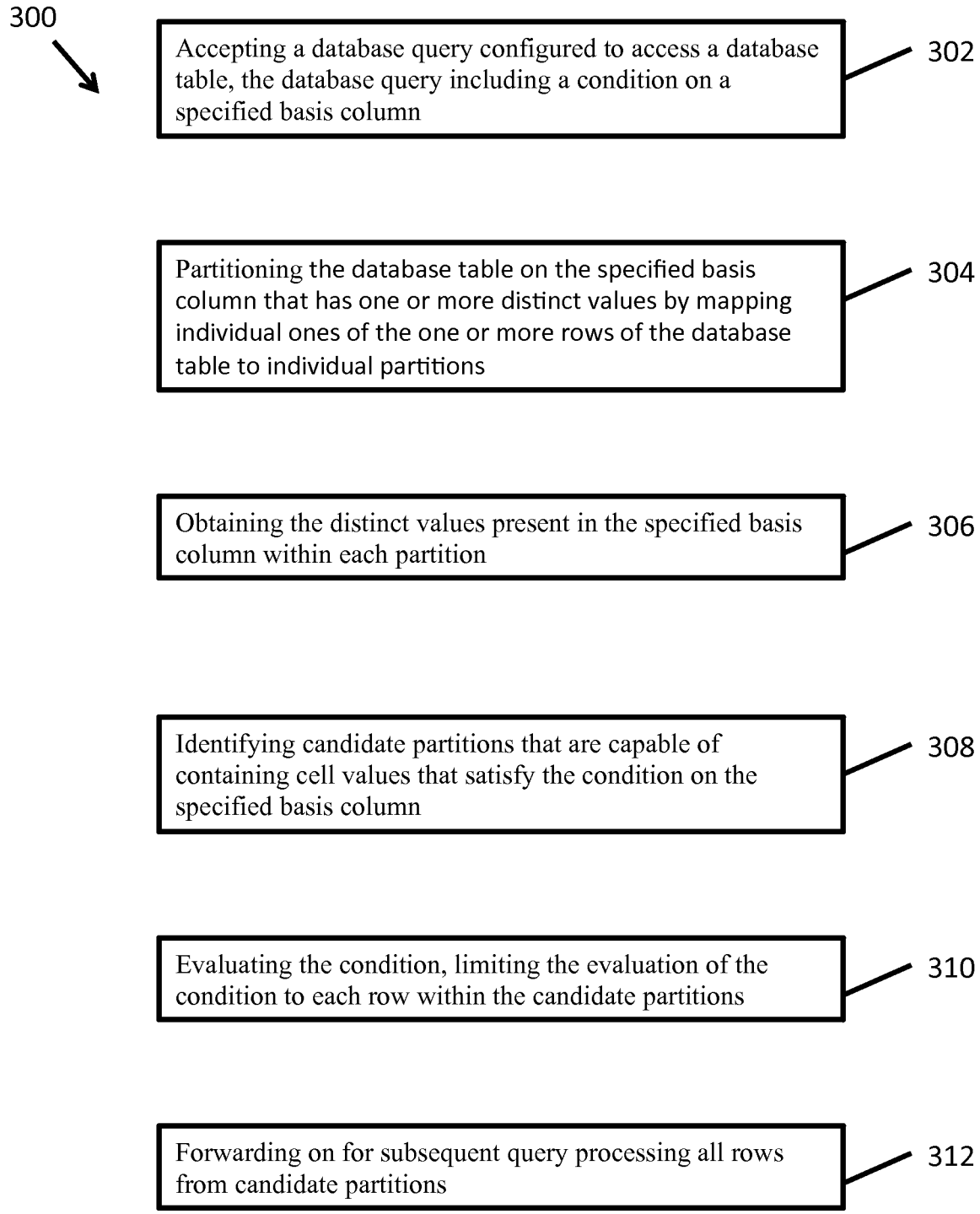
FIG. 3 is a process flow diagram illustrating aspects of a method having one or more features consistent with implementations of the current subject matter.

FIG. 3 is an illustration of a process 300 having one or more elements consistent with the current subject matter. As with the process 200, at 302 a database query can be accepted. The database query can be configured to access a database table having one or more columns and one or more rows. The database query can include a condition on a specified basis column.

At 304, the database table can be partitioned. The database table can be partitioned on the basis of the specified column. The specified column can have one or more distinct values. The partitioning can include mapping individual ones of the one or more distinct values to individual partitions causing each row in the table to be mapped to a specific partition.

At 306, the distinct values present in the specified basis column within each partition can be obtained.

At 308, for each of the partitions based on the specific basis column, it can be identified whether the partition is a candidate partition. A candidate partition can be a partition capable of containing one or more of the distinct values that satisfy the condition on the specified basis column.

At 310, the condition can be evaluated on the specified basis column for each row within the candidate partitions.

At 312, all rows which satisfy the condition on the specified basis column can be forwarded on for subsequent query processing.

In some variations, an additional restriction condition can be inferred. The additional restriction condition that is inferred can be inferred to be one that is satisfied by all rows contained within the candidate partitions. In other variations, the inferred partition restriction condition can be applied. The inferred partition restriction condition can be applied on all rows within the candidate partitions to provide a limited set of rows. The limited set of rows can be rows satisfying the inferred additional restriction condition. The limited set of rows can be forwarded on for additional query processing.

In some variations, guaranteed partitions can be identified. The guaranteed partitions can be partitions that only include cell values guaranteed to satisfy the condition on the specified basis column. All rows of the guaranteed partitions can be forwarded on for subsequent query processing.

Guaranteed partitions can be identified. Guaranteed partitions can be partitions that only include cell values guaranteed to satisfy the condition on the specified basis column. All rows of the guaranteed partitions can be forwarded on for subsequent query processing.

The one or more distinct values of the specified column can be stored as a data dictionary associated with the specified column. The one or more distinct values of the specified column can be stored as a data dictionary associated with individual ones of the partitions. The one or more distinct values of the specified column can be stored at leaves of a B-tree. The one or more rows of the partitioned table can be split across multiple stores. Metadata identifying the distinct values can be stored separately for each store. Candidate partitions can be identified independently for each store. The condition can be independently evaluated for each store. The condition can be evaluated on the specified basis column for each row within the candidate partitions in that store. In some implementations, guaranteed partitions can be identified and evaluated independently for each store.

A restriction condition can be identified that is satisfied by one or more rows of a column associated with the guaranteed partitions only.

The database tables can include one or more integer row identifiers stored as bitmaps. The bitmaps can represent one or more rows in a partition that satisfy one or more conditions of the query.

A compound condition can be generated. The compound condition that can be generated that includes a partition restriction that is satisfied by rows that reside in a candidate partition and satisfied by rows that reside in a guaranteed partition. The compound condition can be evaluated on the rows of the partitioned database table.

An efficiency of generating and applying the compound condition can be determined. The compound condition can be evaluated in response to determining that generating and applying the compound condition increases efficiency. The efficiency of identifying candidate partitions and evaluating the condition on the candidate partitions can be compared to the efficiency of evaluating the condition on every row in the partitions resulting from partitioning the database table on the basis of the specified basis column. The condition can ne evaluated on each row within the candidate partitions in response to determining that it is more efficient to identify the candidate partitions and evaluate the condition on the candidate partitions compared to evaluating the condition on every row in the partitions resulting from partitioning the database table on the basis of the specified basis column.

The values within a database column can be known, and to make access to that knowledge inexpensive the database can store and maintain the set of values associated with that column. Where the set of distinct values present in the partition basis column is known that knowledge can be used to determine whether any "candidate" partitions can be re-categorized as a "disqualified" partition. If none of the partition basis column values present in that "candidate" partition satisfy the query condition then the partition can be designated a "disqualified" partition. Consequently, the number of partitions that have to be evaluated for subsequent query conditions is reduced.

Similarly, when the values within a database column are known, the optimizer can determine whether every value within a "candidate" partition satisfies the column basis query condition. Such partitions can then be designated as "guaranteed" partitions. Consequently, the column basis query condition does not need to be evaluated for rows within that partition because it is guaranteed that every value present in that partition will satisfy the condition.

The currently described partition elimination optimization process can replace the traditional partition elimination optimization processes.

FIG. 4 is an illustration of a table 400, as in FIG. 1, with additional information describing the distinct values present in the partition basis column T.DATE. In some variations, the distinct value information associated with the partition basis column may be stored in the database as part of an enumerated column storage for that partition basis column. In other variations, the distinct value information associated with the partition basis column may be stored as part of a traditional B-Tree index on that column. In other variations, the distinct value information associated with the partition basis column may be stored in some other data structure that is stored for the column as a whole or as a separate structure per partition. The current subject is directed to covering any distinct value information storage system.

Using the first example above, applying the column basis condition T.DATE BETWEEN 'Jul. 1, 2006' AND 'Jan. 31, 2008' to the table 400 and optimizing the partition elimination based on that query condition yields that the "disqualified" partitions are {1, 2, 3, 6, and 7}. None of these partitions contain a value that satisfied the column basis condition. The set of "disqualified" partitions is larger compared to when distinct value information is not known for the partition basis column. The set of "guaranteed" partitions can be determined to be {5}. Consequently, the remaining partitions are the set of "candidate" partitions {4} and only these partitions are the ones where each row has to be evaluated for the column basis condition.

The optimizer was able to identify partition 6 as a "disqualified" partition because none of the partition basis column's distinct values present in partition 6 satisfy the BETWEEN condition. This provides a performance and cost advantage by avoiding the evaluation of the BETWEEN condition for all the rows in both partitions 5 and 6 as compared to using traditional partition elimination optimization methods.

Some conditions may cause an otherwise "candidate" partition to be identified, by the partition elimination optimizer as being empty. Empty partitions do not need to have the query partitions evaluated against them. For example, the condition T.DATE BETWEEN 'Mar. 1, 2006' AND 'Feb. 28, 2007' applied to table 400 will yield an empty set of "candidate" partitions, and a "guaranteed" partition set of {4}. The presence of the partition basis column's set of distinct values can make it simple to apply this enhanced partition elimination optimization for any type of local condition on the partition basis column and for any type of table partitioning, including conditions involving functional expressions over that column, by simply evaluating that condition for each distinct value present in each partition.

As another example, a partition basis column condition can be MONTH(T.DATE)=3. The partition elimination optimizer can identify the set of "disqualified" partitions as {1, 2, 4, 6, and 7}, the set of "guaranteed" partitions as {5}, and the set of "candidate" partitions as {3}. The only partition that has to be evaluated for the partition basis column condition is partition 3.

A database querying system can combine the effects of multiple conditions using bitmaps to represent both the incoming set of rows to be considered by a condition (i.e the rows which satisfied all preceding conditions) and the resulting set of rows that satisfy that condition and all preceding conditions. The partition elimination in such a database querying system can be represented as an additional bitmap-based condition. This additional bitmap-based condition can be inferred from that partition basis column restriction condition.

The goal of the database optimizer when faced with any query containing WHERE clause conditions is to identify the most efficient way to identify the set of relevant rows in that table that satisfy all of the conditions. This evaluation must also consider any constraints imposed by the currently available resources, and it must do all this while attempting to minimize the performance risks associated with any uncertainties in the meta-data regarding the contents within the tables and columns involved.

Bitmap-based database evaluation methods enable the easy combination of the effects of multiple conditions, which are each using some index-based evaluation method, until finally the precise set of rows relevant to a specified query has been identified, and can then be projected for use in the rest of the query.

The problem addressed herein is how to most efficiently evaluate a database query comprising a partition basis column restriction condition plus additional conditions on that same table. This has similarities to how positional text conditions are combined with other conditions in U.S. Pat. No. 8,843,499, issued Sep. 23, 2014, and which is incorporated herein by reference in its entirety.

Figure 5:
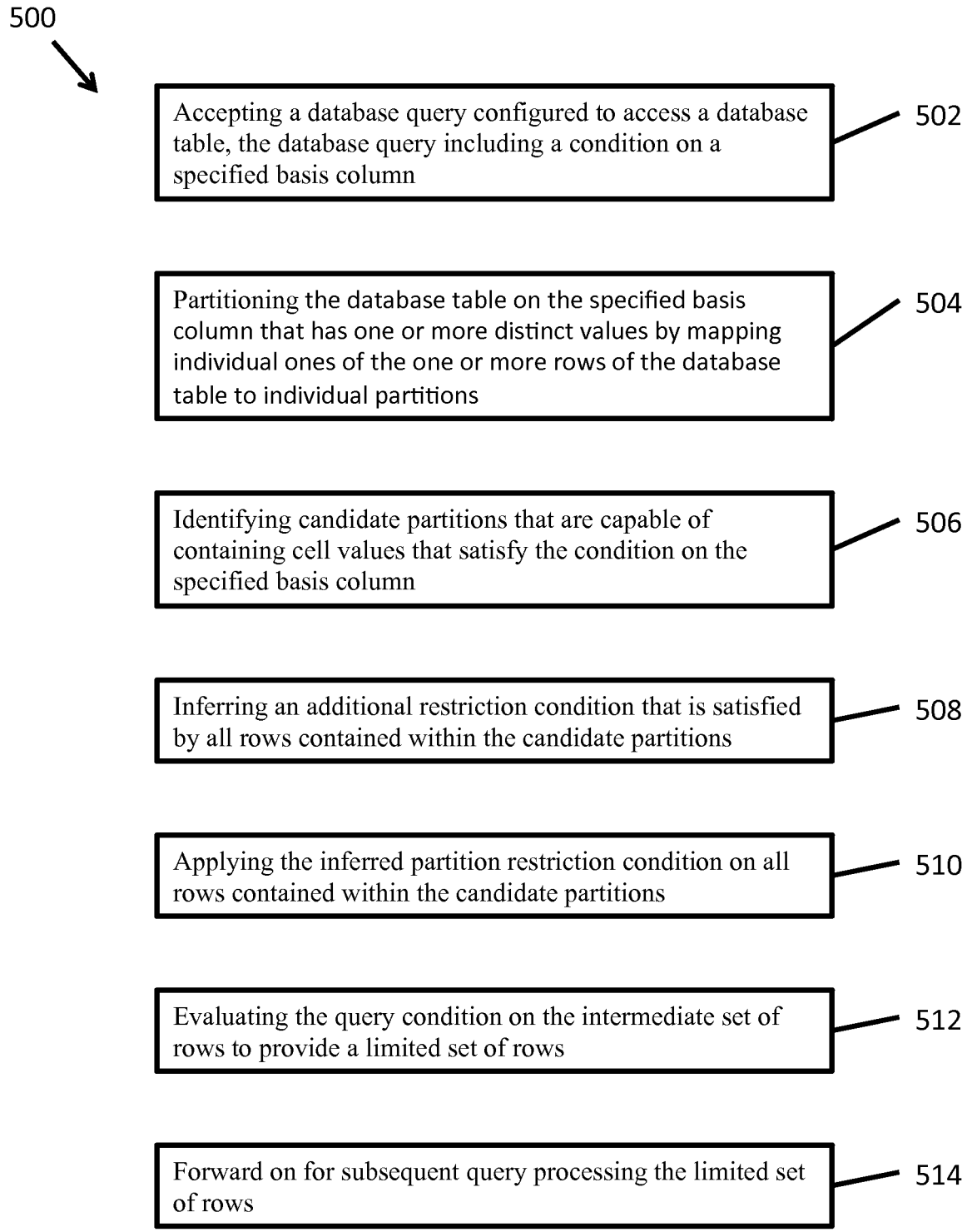
FIG. 5 is a process flow diagram illustrating aspects of a method having one or more features consistent with implementations of the current subject matter; and, FIGS. 6A and 6B are illustrations of partition tables having one or more elements consistent with the current subject matter; and, FIG. 7 is a diagram illustrating features of a business software system architecture having one or more elements consistent with the current subject matter.

FIG. 5 is an illustration of a process 500 having one or more elements consistent with the current subject matter. At 502 a database query can be accepted. The database query can be configured to access a database table having one or more columns and one or more rows. The database query can include a specified column as the basis for partitioning the table and a query condition on that specified partition basis column.

At 504, the database table can be partitioned. The database table can be partitioned on the basis of the specified column within the database. The partitioning can include mapping individual ones of the one or more rows of individual columns to individual partitions on the basis of the specified column. At 506, it can be identified for individual ones of the partitions whether the partition is a candidate partition. The candidate partition can be capable of containing values which can satisfy the query condition. At 508, an additional restriction condition can be inferred that is satisfied by all rows contained within the candidate partitions. At 510, the inferred partition restriction condition can be applied on all rows within the candidate partitions to provide an intermediate set of rows. The intermediate set of rows can satisfy the inferred additional restriction condition. At 512 the query condition can be evaluated on the specified basis column on the intermediate set of rows to provide a limited set of rows that satisfy the condition on the specified basis column. At 514, the limited set of rows that satisfy the condition on the specified basis column can be forwarded for subsequent query processing.

In some variations, the database query can include one or more additional query conditions. Prior to evaluating the query condition on the specified basis column on the intermediate set of rows the one or more additional query conditions can be applied on all rows in the intermediate set of rows.

Prior to inferring the additional restriction condition, guaranteed partitions can be identified. The guaranteed partitions can be partitions containing cell values guaranteed to satisfy the condition on the specified basis column. All rows from the guaranteed partitions together with the limited set of rows can be forwarded for subsequent query processing.

The efficiency of inferring an additional restriction condition that is satisfied by all rows contained within the candidate partitions and applying the inferred additional restriction condition can be compared to the efficiency of applying the query condition to every row in the partitions resulting from partitioning the database table on the basis of the specified basis column.

The inferred partition restriction condition can be applied on all rows within the candidate partitions in response to determining that inferring and applying the additional restriction condition is more efficient than applying the query condition to every row in the partitions resulting from partitioning the database table on the basis of the specified basis column.

For example, the following set of conditions local to table 400, including a BETWEEN partition basis column restriction condition can be applied:

T.CUSTOMER_ID=1634679
AND T.DATE BETWEEN 'Jul. 1, 2006' AND 'Jan. 31, 2008'
AND T.STATUS='RETURNED'

The partition elimination optimizer can identify that partitions {1, 2, 3, and 7} are "disqualified" partitions, leaving partitions {4, 5, and 6} as the "candidate" partitions. An additional conjunctive local condition can be inferred by the optimizer to reduce the set of candidate partitions. Such an inferred conjunctive local condition can include AND PARTITION_NUMBER(T.DATE) IN (4, 5, 6). The precise form of this partition restriction condition can be arbitrary. The only requirements on the conjunctive local condition is that the condition must be able to accept either one or more direct partition identifiers (e.g. a list of partition numbers) or one or more indirect partition identifiers (e.g. the distinct values in the partition basis column, or the name of the column), and it must produce a resultant bitmap that identifies the rows residing in that set of partitions. In either case, the optimizer can construct the partition restriction condition in the required form.

If we apply this inferred condition, while using the knowledge of the distinct values present in the column but without determining the "guaranteed" partitions, then the optimizer can identify that the candidate partition {6} contains no values which satisfy the BETWEEN condition, and therefore the BETWEEN condition must be evaluated against the remaining "candidate" partitions {4, and 5}, and that restriction can be expressed via the inference of an additional conjunctive local condition: AND PARTITION_NUMBER(T.DATE) IN (4, 5)

If we consider the BETWEEN condition while using the knowledge of the distinct values present in the column and while determining the "guaranteed" partitions, then the optimizer can determine that the guaranteed partitions are {5} and the candidate partitions are {4}. The optimizer can then rewrite the original partition basis column restriction condition into a more complex set of conditions. The more complex set of conditions can then be simplified in certain cases back into simple conditions. To restrict the evaluation of the original partition basis column restriction condition to the rows within the "candidate" partitions, while also including the rows from the "guaranteed" partitions, the most general form of this rewrite is to replace <partition-basis-column-restriction> with (<partition-restriction-to-guaranteed-partitions> OR (<partition-restriction-to-candidate-partitions> AND <partition-basis-column-restriction>)).

If either partition-restriction has an empty set of partitions, then that restriction can conceptually be replaced by an "always false" condition and the resulting expression can then be simplified. If the "guaranteed" partition set is empty and the "candidate" partition set is empty, then the rewrite is a condition which yields the empty set of rows, for example the condition "1=0".

If the set of "guaranteed" partitions is empty and the set of "candidate" partitions is not empty, then the rewrite is to replace <partition-basis-column-restriction> with (<partition-restriction-to-candidate-partitions> AND <partition-basis-column-restriction>). If the set of "guaranteed" partitions is not empty and the set of "candidate" partitions is empty, then the rewrite is to replace <partition-basis-column-restriction> with <partition-restriction-to-guaranteed-partitions>. Consequently, for table 400 and using the example column basis conditions above, the optimizer can identify the set of "disqualified" partitions as {1, 2, 3, 6, and 7}, the set of "guaranteed" partitions as {5}, and the set of "candidate" partitions contains only {4}. In this situation the inferred partition restriction condition needs to be combined with the partition basis column restriction condition such that the whole set of local conditions becomes:

T.CUSTOMER_ID=1634679 AND (PARTITION_NUMBER(T.DATE) IN (5) OR (PARTITION_NUMBER(T.DATE) IN (4) AND T.DATE BETWEEN 'Jul. 1, 2006' AND 'Jan. 31, 2008')) AND T.STATUS='RETURNED'

Note in this case, the inference has replaced the original conjunctive partition basis column restriction condition with a disjunctive condition that combines the "guaranteed" partition restriction with the original partition basis column restriction condition that has been limited via conjunction to the "candidate" partitions.

Where the database has some mechanism to either store a bitmap per partition or to efficiently generate a bitmap given a partition number or a set of partition numbers, then this partition number restriction condition is very efficient. However, on a cost basis there might be times when minimizing the cost of the whole set of conditions would require that some other condition be evaluated first. For example, in the condition set above, if the T.CUSTOMERID condition is satisfied by 100 rows while each partition has 1 million rows, then evaluating the T.CUSTOMER_ID condition before the PARTITION_NUMBER condition would be more efficient. Having the partition restriction expressed as just another condition thereby allows it to be reordered, prior to execution, by the optimizer among the set of all other conditions so as to minimize the cost of evaluating the whole set of local conditions.

The inference of the PARTITION_NUMBER condition could itself take considerable time, especially if there are a lot of distinct values present in the partition basis column. Consequently, this inference should ideally be done on a cost basis.

FIG. 6A is an illustration of a table 600 being a partition of a database table in accordance with one or more elements of the currently described subject matter. In some implementations, it is necessary to have a mechanism to efficiently access a set of distinct values present in the partition basis column. An example of a mechanism can include creating and maintaining a data structure configured to store a list of partition basis column values. The partition basis column values being present within each partition that contains any rows. FIG. 6B is an illustration of an example of a data structure 602 configured to store a list of partition basis column values.

Given the example of data structure 602, if a query is received having a condition S.CUSTOMER BETWEEN 20000 and 40000, the optimizer can access the data structure 602 and identify that the only column cell values which satisfy that condition are {24240, 35973}. These column cell values fall within partitions {1914} and {1915}, respectively. Consequently, the optimizer can determine that the "candidate" partitions are {1914, 1915}. In some implementations, the optimizer can be configured to determine which partitions comprise only cell values that will satisfy the condition. In this particular example, the only partition which has cell values that will all satisfy the given condition of S.CUSTOMER BETWEEN 20000 and 40000 is partition {1915}. While partition {1914} contains a cell value that will satisfy the condition, it also contains cell values that will not. In summary, for the example table and the example, the guaranteed partitions are {1915} and the candidate partitions are {1914}.

To determine which partitions are "guaranteed" is necessary to have and use the knowledge of the distinct values actually present in the table.

In some variations, the optimizer can be configured to infer an additional restriction condition that is satisfied by all rows contained within the candidate partitions. An example of such an additional restriction condition can be PARTITION_NUMBER(S.CUSTOMER) IN (1914, 1915). Applying the implied additional restriction to the example above, the optimizer can be configured to replace the original BETWEEN condition with the following complex condition: (PARTITION_NUMBER(S.CUSTOMER) IN (1915) OR (PARTITION_NUMBER(S.CUSTOMER) IN (1914) AND S.CUSTOMER BETWEEN 20000 and 40000)).

For a different has partition basis column condition S.CUSTOMER BETWEEN 30000 and 40000, the only distinct cell value in table 602 which satisfies the condition is 35973. In this example, the "candidate" partition set is {1915}. Where the optimizer is configured to determine the "guaranteed" partition set, the determined "guaranteed" partition set is {1915}. Consequently, the "candidate" partition set is empty.

For another example, the partition basis column condition can be provided as S.CUSTOMER BETWEEN 20000 and 30000. The only distinct value in table 602 that satisfies the partition basis column condition is 24240. The optimizer can be configured to determine the "candidate" partition set. For this example, the "candidate" partition set is {1914}. The optimizer can be configured to determine the "guaranteed" partition set. Since there are several distinct values contained in the only partition that contains cell values satisfying the partition basis column condition, the "guaranteed" partition set is empty. The "candidate" partition set is {1914}.

The optimizer can be configured to provide further performance optimization. Further performance optimization can be derived in cases where the partitioned table is split across multiple separate stores. Metadata identifying the distinct values present in the partitions can be stored separately for each store. In such cases, the determination of the set of "candidate" partitions and the consequent partition elimination optimization can be applied independently for each store. Similarly, where the optimizer is configured to determine the set of "guaranteed" partitions and the set of "candidate" partitions, the determination of the set of "guaranteed" partitions and the set of "candidate" partitions can be done independently for each store. That determination and consequent partition elimination optimization can also be done for all stores that do have such column distinct value metadata, even when some of those stores do not have such metadata available. Examples of tables split across such separate stores include, but are not limited to: a table split between a row store portion and a column store portion; a table split across a set of shared-nothing host nodes; a table that is both hash partitioned and range partitioned where the range partitioning determines into which store each row is placed; and a table split by life cycle management into separate hot portions, warm portions, and cold portions.

Figure 7:
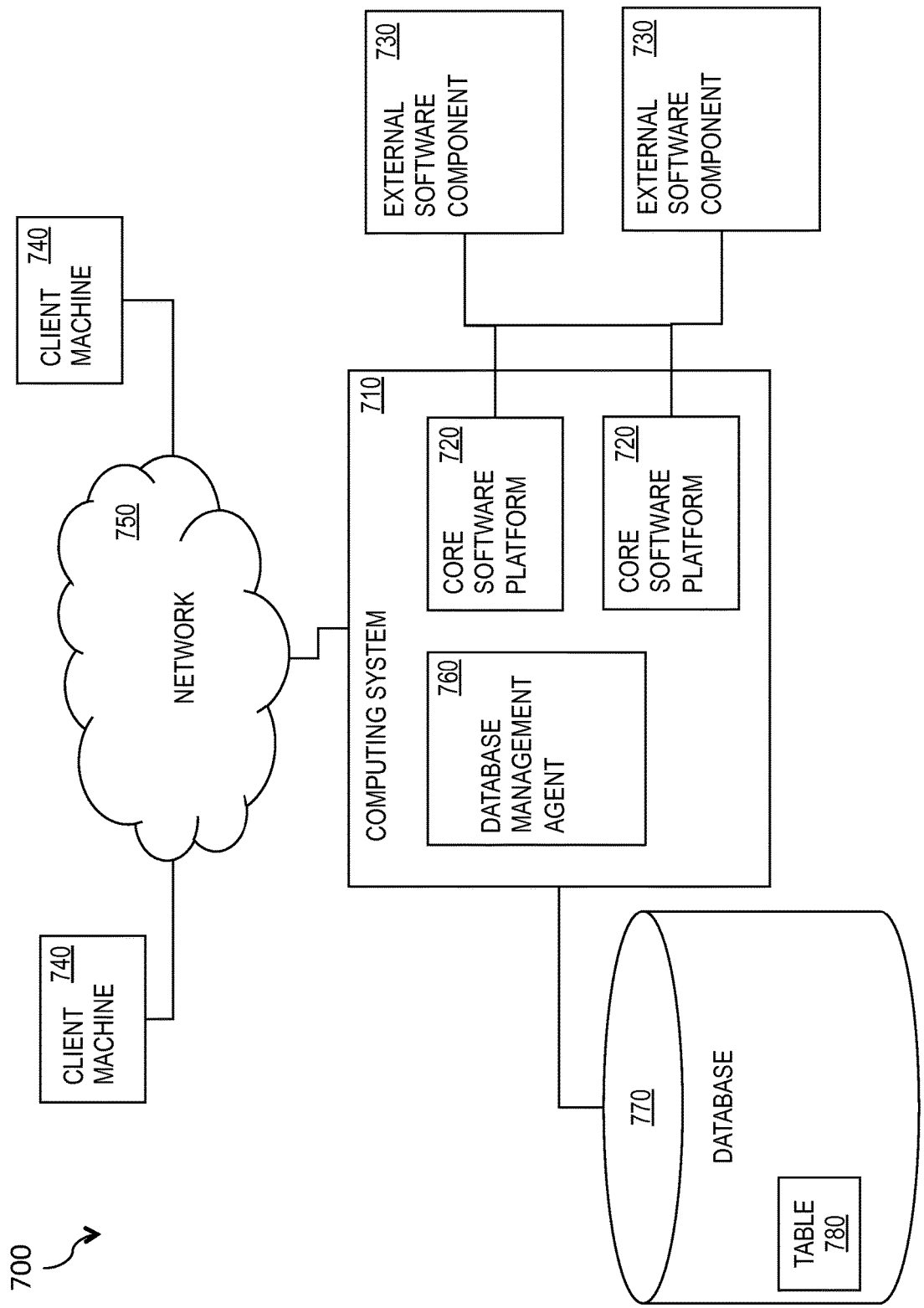

FIG. 7 is a diagram illustrating features of a business software system architecture 700, having one or more elements consistent with the current subject matter. The described business software system architecture 700 is just one implementation of a system capable of implementing one or more elements of the subject matter described in this disclosure. Other systems are contemplated by the inventors for implementing the current subject matter. A computing system 710 can include one or more core software platform modules 720 providing one or more features of the business software system. The computing system 710 can also aggregate or otherwise provide a gateway via which users can access functionality provided by one or more external software components 730. Client machines 740 can access the computing system, either via a direct connection, a local terminal, or over a network 750 (e.g. a local area network, a wide area network, a wireless network, the Internet, or the like).

A database management agent 760 or other comparable functionality can access a database management system 770 (sometimes simply referred to as a database) that stores and provides access to data (e.g. definitions of business scenarios, business processes, and one or more business configurations as well as data, metadata, master data, etc. relating to definitions of the business scenarios, business processes, and one or more business configurations, and/or concrete instances of data objects and/or business objects that are relevant to a specific instance of a business scenario or a business process, and the like). The database management system 770 can include at least one table 780. As will be described below in further detail, the database management system 770 can include random-access memory such as DRAM and byte-addressable memory such as storage class memory (SCM). The SCM can take many forms including, without limitation, next generation FLASH, FeRAM (ferroelectric RAM), MRAM (magnetic RAM), RRAM (resistive RAM), solid electrolyte, PC-RAM (phase-change RAM).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method implemented by at least one programmable processor forming at least one computing device, the method comprising:

accepting, by the at least one programmable processor, a database query configured to access a database table having one or more columns and one or more rows, the database query including a condition on a specified basis column;

partitioning, by the at least one programmable processor, the database table on the basis of the specified basis column, the specified basis column comprising a plurality of distinct values and the partitioning including:

mapping, by the at least one programmable processor, individual ones of the plurality of distinct values to individual partitions causing each row in the table to be mapped to a specific partition, at least two distinct values of the plurality of distinct values in the specified basis column within at least one individual partition of the individual partitions;

obtaining, by the at least one programmable processor, the distinct values present in the specified basis column within each individual partition;

identifying, by the at least one programmable processor, for each of the individual partitions based on stored information about the plurality of distinct values in the specified basis column, whether the individual partition is a guaranteed partition for which all of the distinct values in the individual partition are guaranteed to satisfy the condition on the specified basis column, a subsequent evaluation partition for which one or more but not all of the plurality of distinct values in the individual partition satisfy the condition on the specified basis column, or a disqualified partition for which none of the distinct values in the individual partition satisfy the condition on the specified basis column, wherein the stored information is associated with but not part of the specified basis column;

evaluating, for only the subsequent evaluation partitions, by the at least one programmable processor, the condition on the specified basis column for each row within the subsequent evaluation partitions;

generating, by the at least one programmable processor, a bitmap having one bit per row of at least one of the subsequent evaluation partitions, the bitmap representing the condition on the specified basis column for each corresponding row within the subsequent evaluation partitions; and forwarding on, by the at least one programmable data processor, for subsequent query processing all rows represented by the bitmap as satisfying the condition on the specified basis column.

2. The method as in claim 1, further comprising:

inferring, by the at least one programmable processor, an additional restriction condition that is satisfied by all rows contained within the subsequent evaluation partitions;

applying, by the at least one programmable processor, the inferred partition restriction condition on all rows within the subsequent evaluation partitions to provide a limited set of rows, the limited set of rows satisfying the inferred additional restriction condition; and, forwarding on for subsequent processing the limited set of rows.

3. The method as in claim 1, further comprising:

forwarding on for subsequent query processing all rows of the guaranteed partitions.

4. The method as in claim 2, further comprising:

forwarding on for subsequent query processing all rows of the guaranteed partitions.

5. The method as in claim 1, wherein the stored information comprises a data dictionary associated with the specified basis column, the data dictionary storing the plurality of distinct values of the specified basis column.

6. The method as in claim 1, wherein the stored information comprises a data dictionary associated with each partition of the individual partitions.

7. The method as in claim 1, wherein the one or more rows of the partitioned table are split across multiple stores and wherein the stored information comprises metadata identifying the distinct values stored separately for each store of the multiple stores, and wherein the method further comprises:

independently, for each store of the multiple stores, identifying, by the at least one programmable processor, subsequent evaluation partitions in that store using the stored information; and, independently, for each store of the multiple stores, evaluating, by the at least one programmable processor, the condition on the specified basis column for each row within the subsequent evaluation partitions in that store using the stored information.

8. The method as in claim 3, wherein the one or more rows of the partitioned table are split across multiple stores and metadata identifying the distinct values are stored separately for each store the method further comprises:

independently, for each store of the multiple stores, identifying, by the at least one programmable processor, subsequent evaluation partitions in that store using the stored information;

independently, for each store, identifying, by the at least one programmable processor, local guaranteed partitions in that store using the stored information, the guaranteed partitions comprising the local guaranteed partitions;

independently, for each store, evaluating, by the at least one programmable processor, the condition on the specified basis column for each row within the subsequent evaluation partitions in that store using the stored information; and, independently, for each store, evaluating, by the at least one programmable processor, the condition on the specified basis column for each row within the guaranteed partitions in that store using the stored information.

9. The method as in claim 3, further comprising:

identifying, by the at least one programmable processor, a restriction condition that is satisfied by one or more rows of a column associated with the guaranteed partitions only.

10. The method as in claim 1, further comprising:

generating, by the at least one programmable processor, a compound condition that includes a partition restriction that is satisfied by rows that reside in the subsequent evaluation partition and satisfied by rows that reside in the guaranteed partition; and, evaluating, by the at least one programmable processor, the compound condition on the rows of the partitioned database table.

11. The method as in claim 10, further comprising:

determining, by the at least one programmable processor, an efficiency of generating and applying the compound condition;

evaluating, by the at least on programmable processor, the compound condition in response to determining that generating and applying the compound condition increases efficiency.

12. The method as in claim 1, further comprising:

determining, by the at least one programmable processor, the efficiency of identifying subsequent evaluation partitions and evaluating the condition on the subsequent evaluation partitions compared to evaluating the condition on every row in the partitions resulting from partitioning the database table on the basis of the specified basis column; and, wherein evaluating the condition on each row within the subsequent evaluation partitions is performed in response to determining that it is more efficient to identify the subsequent evaluation partitions and evaluate the condition on the subsequent evaluation partitions compared to evaluating the condition on every row in the partitions resulting from partitioning the database table on the basis of the specified basis column.

13. The method as in claim 2, wherein the database query includes one or more additional query conditions and the method further comprises, prior to evaluating the query condition on the specified basis column on the limited set of rows:
　applying, by the at least one programmable processor, the one or more additional query conditions on all rows in the limited set of rows.

14. The method as in claim 2, further comprising:
　determining, by the at least one programmable processor, the efficiency of inferring an additional restriction condition that is satisfied by all rows contained within the subsequent evaluation partitions and applying the inferred additional restriction condition compared to applying the query condition to every row in the partitions resulting from partitioning the database table on the basis of the specified basis column; and,
　wherein applying the inferred partition restriction condition on all rows within the subsequent evaluation partitions is performed in response to determining that inferring and applying the additional restriction condition is more efficient than applying the query condition to every row in the partitions resulting from partitioning the database table on the basis of the specified basis column.

15. A system comprising:
　at least one programmable processor; and
　memory storing instructions which, when executed by the at least one programmable data processor, cause the at least one programmable processor to perform operations comprising:
　　accepting a database query configured to access a database table having one or more columns and one or more rows, the database query including a condition on a specified basis column;
　　partitioning the database table on the basis of the specified basis column, the specified basis column comprising a plurality of distinct values and the partitioning including:
　　　mapping individual ones of the plurality of distinct values to individual partitions causing each row in the table to be mapped to a specific partition, at least two distinct values of the plurality of distinct values in the specified basis column within at least one individual partition of the individual partitions;
　　obtaining the distinct values present in the specified basis column within each individual partition;
　　identifying for each of the individual partitions based on stored information about the plurality of distinct values in the specified basis column whether the individual partition is a guaranteed partition for which all of the distinct values in the individual partition are guaranteed to satisfy the condition on the specified basis column, a subsequent evaluation partition for which one or more but not all of the plurality of distinct values in the individual partition satisfy the condition on the specified basis column, or a disqualified partition for which none of the distinct values in the individual partition satisfy the condition on the specified basis column, wherein the stored information is associated with but not part of the specified basis column;
　　evaluating for only the subsequent evaluation partitions the condition on the specified basis column for each row within the subsequent evaluation partitions;
　　generating a bitmap having one bit per row of at least one of the subsequent evaluation partitions, the bitmap representing the condition on the specified basis column for each corresponding row within the subsequent evaluation partitions; and
　　forwarding on for subsequent query processing all rows represented by the bitmap as satisfying the condition on the specified basis column.

16. A non-transitory computer program product storing instructions which, when executed by at least one programmable processor forming part of at least one computing device, cause the at least one programmable processor to perform operations comprising:
　accepting a database query configured to access a database table having one or more columns and one or more rows, the database query including a condition on a specified basis column;
　partitioning the database table on the basis of the specified basis column, the specified basis column comprising a plurality of distinct values and the partitioning including:
　　mapping individual ones of the plurality of distinct values to individual partitions causing each row in the table to be mapped to a specific partition, at least two distinct values of the plurality of distinct values in the specified basis column within at least one individual partition of the individual partitions;
　obtaining the distinct values present in the specified basis column within each individual partition;
　identifying for each of the individual partitions based on stored information about the plurality of distinct values in the specified basis column whether the individual partition is a guaranteed partition for which all of the distinct values in the individual partition are guaranteed to satisfy the condition on the specified basis column, a subsequent evaluation partition for which one or more but not all of the plurality of distinct values in the individual partition satisfy the condition on the specified basis column, or a disqualified partition for which none of the distinct values in the individual partition satisfy the condition on the specified basis column, wherein the stored information is associated with but not part of the specified basis column;
　evaluating for only the subsequent evaluation partitions the condition on the specified basis column for each row within the subsequent evaluation partitions;
　generating a bitmap having one bit per row of at least one of the subsequent evaluation partitions, the bitmap representing the condition on the specified basis column for each corresponding row within the subsequent evaluation partitions; and
　forwarding on for subsequent query processing all rows represented by the bitmap as satisfying the condition on the specified basis column.

\* \* \* \* \*